United States Patent [19]

Allingham

[11] Patent Number: 5,138,792
[45] Date of Patent: Aug. 18, 1992

[54] PLASTIC SHEETS FOR USE IN AGRICULTURE

[76] Inventor: Yael Allingham, P.O. Box 14, Benjamina, Israel

[21] Appl. No.: 521,250

[22] Filed: May 9, 1990

[30] Foreign Application Priority Data

May 17, 1989 [IL]  Israel ........................................ 90321

[51] Int. Cl.⁵ .................................................. A01G 7/00
[52] U.S. Cl. ..................................... 47/9; 47/DIG. 6
[58] Field of Search .............................. 47/9 S, DIG. 6

[56] References Cited

U.S. PATENT DOCUMENTS

| | | | |
|---|---|---|---|
| 3,252,250 | 5/1966 | Lemaire | 47/9 S |
| 3,372,513 | 3/1968 | Shlesinger | 47/9 S |
| 3,857,804 | 12/1974 | Glatti | 47/9 S |

FOREIGN PATENT DOCUMENTS

| | | | |
|---|---|---|---|
| 124556 | 10/1978 | Japan | 47/9 S |
| 15842 | 2/1979 | Japan | 47/9 S |
| 79822 | 5/1982 | Japan | 47/9 S |

*Primary Examiner*—Henry E. Raduazo
*Attorney, Agent, or Firm*—Edwin D. Schindler

[57] ABSTRACT

The invention relates to polymeric mulch sheets and mulch films for use in agriculture. These filter out a large part of the solar radiation which promotes photosynthesis and plant development, and transmits enough solar radiation so as to heat the soil beneath such films. The sheets or films have a green color and transmit about 15-30 percent of the energy in the green range, and a large percentage of the energy in the 730 to 1100 nm range. Such mulch films substantially reduce weed growth. The invention further relates to a method of plant cultivation where the plants are cultivated, using sheets or films according to the invention.

5 Claims, 1 Drawing Sheet

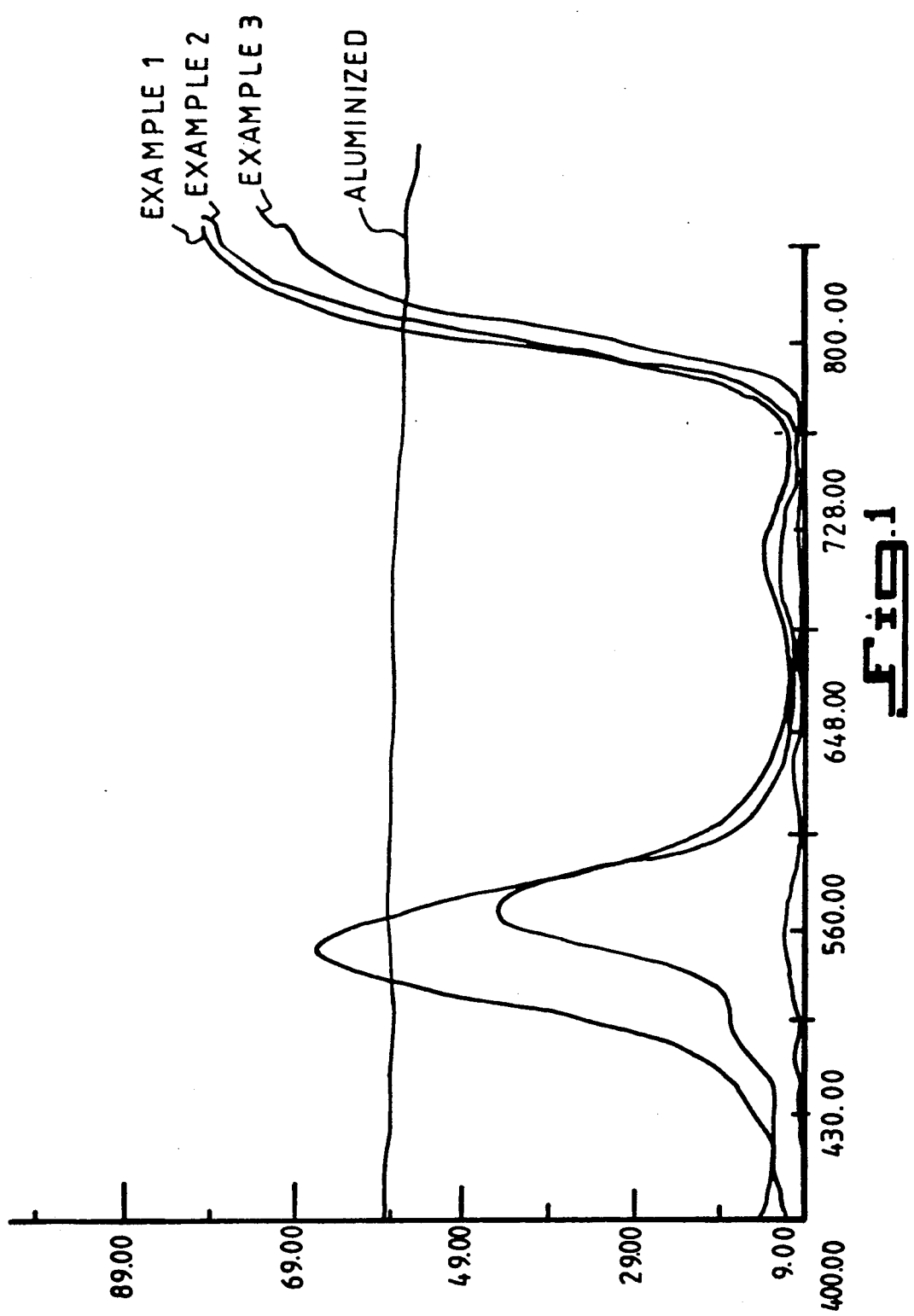

PLASTIC SHEETS FOR USE IN AGRICULTURE

FIELD OF THE INVENTION

The invention relates to mulch film for use in agriculture. The film is opaque to the photosynthetic active radiation (PAR) required for plant development which encourages weed growth. However, it transmits solar radiation in the Far-red and some of the green part of the spectrum thus heating the soil covered by the mulch. This mulch will allow roots of crops grown under it to have no weeds to compete with, without the use of herbicides and higher temperature than under black film for root development.

BACKTROUND OF THE INVENTION

Polyethylene (PE) is a favoured plastic as film in the use of agriculture for its cheapness, flexibility, and ease to manufacture. It can be had in a variety of thicknesses and width. It is known in its low density form (LDPE) and recently as linear low density (LLDPE). The latter has preferred mechanical strength and can be used as a 20 micron film, for mulching. Both PE films can be stabilizied against UV radiation by the use of Hindered Amines Light Stabilizers (HALS) with the addiion of hydroxy-benzophenones. The sun's radiation reaching the earth's surface consists of about 53% light intensity in the visible part of the spectrum, 0.4-0.7 microns which is also PAR with a maximum intensity at 0.56 mcirons, the green light being at about $0.56\mu$, 3% in the ultra violet (UV), from 0.3-0.4 microns; and 40% in the far red (FR) from 0.7-1.1 mcirons. Roots of agricultural crops sown or planted out in Spring or Summer have to be protected from loss of water by evaporation from the surface of the soil. Cooling of the soil is caused by evaporation, radiation at night and heat conductivity.

Evaporation and temperature can be controlled by a plastic film cover termed "mulch". Furthermore, young crop seedlings should not have to compete with weeds for water and nutriments; this can be achieved by use of herbicides, elimination of light, or as we claims by elimination of the Photosynthetic Active Radiation.

The practice is to spread plastic sheets on the surface of the soil, make holes at intervals to sow seeds or plant crop seedlings. Using black PE mulch which does not transmit the sun's radiation prevents the growth of weeds and stops evaporation but it does not heat the soil as it does not transmit any radiation. The plastic itself warms up and can cause severe scorching of young seedlings that touch it. Clear PE film which transmits all the solar radiation will heat up the soil but will also encourage the growth of weeds unless a herbicide has been applied.

We are aware of commercial films claiming the reduction of transmission of solar radiation and thus preventing weed formation. U.S. Pat. No. 3,857,807 (Montecatini) claims that PVC films which selectively allow transmission of visible light and FR increase crop yield compared to black film mulch. Surprisingly, they allow the transmission of red light 0.6-0.7 microns which is PAR that encourages wee dgrowth. They may have used herbicides. They further claim they allow 60-90% transmission of radiation above 0.1 micron which is surprising as there is no radiation below 0.3 microns reaching the earth's surface.

SUMMARY OF THE INVENTION

According to the present invention there are provided novel, improved mulch films. These are photosensitive and are characterized in that they transmit energy in the green color range of the spectrum, and also some of the far red. According to a preferred embodiment of the vention there are used mulch films which transmit from about 15 to about 40 percent of the total solar energy in the green range, the preferred transmission being about 20 percent of this energy in the green, with a maximum at about 0.56 microns.

Furthermore the films transmit in the far red, from about $0.75\mu$ and up. The films of the invention are produced from a suitable polymer into which there is incorporated a predetermined quantity of a pigment which imparts to it a green color, preferably in conjunction with a UV absorber.

According to a preferred embodiment PE films are used, and pigment is added so as to allow the passage of about 20 percent of the solar energy in the green.

Such films are of any desired thickness, the preferred range being about 20 microns to about 75 microns thickness.

Preferably linear low density polyethylene (LLDPE) is used. There can also be used a PVC sheet, a vinyl acetate polyethylene copolymer (EVA) as well as other commercially available polymers having similar properties.

UV absorber is used to prevent degradation by solar energy. There are used commercially available UV absorbers, according to the instructions of the supplier.

Preferably organic pigments are used, the quantity used being such as to result in the desired percentage of transmission in the green, which is generally about 5 to 10 weight percent calculated on the weight of the polymer.

Such novel mulch films can be used in the open field, in tunnels (walk-in and low ones) as well as in greenhouses.

The mulch film is spread out on the soil before sowing and before planting of seedlings, which is dones through holes made in the film at required distances from each other. Such films remain in place for the entire duration of the cultivation.

Comparisons were made between transparent polyethylene sheeting, black commercial mulch film and mulch films of the present invention transmitting various percentages of the green radiation. There was also used for comparison an aluminized film transmitting a certain percentage (about 50 percent) of the entire range of solar spectrum.

In the following results are presented which demonstrate that the best results are obtained with mulch films of the invention, of green color, and which transmit preferably about 20 percent of the total energy in the green range.

The most efficient mulch was the one that absorbed all the PAR except for about 20% of the green, with a peak at 0.56 microns and transmitted in addition, all the Far Red thus preventing weed growth and warming the soil to within the temperature reached by clear PE. The films used in the trials were always of a thickness essentially between 20-80 microns' range.

EXAMPLE 1

Comparative Example

85 Kg. LLDPE (Linear Low Density PE) Dowlex of Dow Chemical Co., were stabilized with Chimassorb 944 and Chimassorb 81 (Ciba Geigy) as recommended by the manufacturer. This was mixed in an extruder with master batches (concentration of 40% pigment in LDPE) of Hoechst pigments 45 kg blue BNAE and 4 kg red BBCE and 7 kg yellow GGAE, and blown into a sleeve of 1.5 meter circumference and of 30 micron thickness. The sleeve was slit lengthwise to give a flat film. This film did not transmit any visible light but only the FR.

EXAMPLE 2

Comparative Example 62 kg LDPE 31 kg LLDPE stabilized as in Example 1, were mixed with master-batch of Hoechst's 3 kg blue BNAE and 3 kg yellow HRAE in an extruder as in Example 1. The film transmitted 40% of the green at 0.56 microns and all the far-red.

EXAMPLE 3

62 LDPE, 3%/kg LLDPE stabilized as in Example 1, and 6 kg of master batch Vis-Col of CONSTAB CO. were made into a film as above (green color). The film transmitted 20% of green at 0.56 micron and all FR.

Methods and Trials

Weed control trials were performed in a light loamy soil. A drip irrigation system was laid in the center of each plot, four rows of seeds of common weeds were sown, each plot was covered with one of the test films; one remaining plot was not covered, as control.

Results

At the end of 4 weeks, a good growth of weeds covered the control plot and the one under clear PE. An appreciable growth developed under the aluminized film and under Example 2. Under films of Examples 1, 3 and black mulch, a few seeds germinated but were etiolated, and did not develop.

Heat Content of the Soil

The temperatures were recorded with the aid of sensors inserted into the soil at surface 3, 9 and 27 cm depth, and recorded over 24 hour periods. Highest temperature was recorded under clear PE and lowest under black PE. The green mulch reached temperatures near those of PE.

Crop Trials a) Melons grown under mulch of Example 3, ripened a week earlier than those under black film.

b) Gypsophyla flower psikes were ready for cutting earlier than under black PE.

Conclusions

The green photo selective mulch, Example 3, has an advantage over black and clear mulch film as it prevents weed growth without the use of herbicides and warms the soil up almost as clear PE.

Results obtained in all the experiments indicate a substantial reduction of the incidence of weed growth, and this without the use of any herbicide. (Comparative experiments with transparent PE film show that there occurred a heavy growth of weeds, preventing development of the seedlings.)

With black mulch film weed growth was inhibited, but the temperature of the soil was lower than under the green mulch film, and as a consequence crops (vegetables and flowers) developed later than under the green film. This earlier ripening, for example of melons, tomatoes, flowers etc. is of great commercial significance, as the earlier crops can be sold at considerably higher prices.

The elimination fo the requirement to use herbicides is of crucial importance especially as regards residual toxicity, not to mention the high cost of such herbicides.

The conclusions are as follows:

Weed Control

AT the end of 4 weeks, a heavy growth of weeds was observed in the control plot and under clear PE mulch.

Weed growth clear PE was so vigorous that it lifted the mulch film. Under aluminized mulch an appreciable growth of weeds was observed.

Under Example 2 which transmitted 40% of green lights, some weeks developed. Under green mulch film of the invention, Example 3, and under black mulch, a few seed germinated, but growth was poor and plants were etiolated with little chlorphyl.

Heat Content

The temperature in the soil under clear PE and mulch films was recorded.

The number of hours at different temperatures below 20° C. was calculated.

The hour-degree below 20° C. gives the energy content difference in soil under the mulches.

Lower number of hours below 20° C. highest under PE with green film of the invention, was appreciably close to it as well as that in Examples 1 and 2.

Under aluminized mulch and black mulch, more hours under 20° C. were recorded, indicating lower temperatures and lower heat content in soil.

As mulch film under Examples 1 and 2 showed poor weed control, mulch of the invention indicated both weed control and more heat-content in soil.

I claim:

1. A polymeric mulch film or sheet for use in agriculture comprising a green color which filters out over 90% of the photosynthetic active radiation for photosynthesis and for plant development, said photosynthetic active radiation filtered out being in the red range and blue range of the electromagnetic spectum, said polymeric mulch film or sheet transmitting about 15-40% solar energy in the green range with a maximum transmittance being obtained at approximately 560 nm, said polymeric mulch film or sheet further transmitting in the far red range at approximately 750-1,100 nm.

2. A film or sheet according to claim 1, which transmits about 20 percent of the solar radiation in the green color range.

3. A film according to claim 1, which contains a stabilizer against UV-radiation degradation, and which is about 20 to 100 microns thick.

4. A film according to claim 1, made of low density polyethylene, of linear low density polyethylene, of PVC, or of vinyl acetate polyethylene copolymer.

5. A film according to claim 1, which transmits enough solar energy to heat the soil beneath the mulch film, so as to promote plant growth and prevent infestation with weeds.

* * * * *